3,752,851
ANTI-DIABETICALLY ACTIVE SULFONYL-UREAS AND SULFONYL-SEMICARBAZIDES
Werner Winter, Mannheim, Erich Fauland and Kurt Stach, Mannheim-Waldhof, Felix Helmut Schmidt, Mannheim-Neuostheim, and Walter Aumuller, Kelkheim-Munster, Germany, assignors to Boehringer Mannheim Gesellschaft mit beschrankter Haftung
No Drawing. Original application Mar. 11, 1968, Ser. No. 711,840, now Patent No. 3,646,009. Divided and this application Sept. 21, 1971, Ser. No. 182,516
Claims priority, application Germany, Mar. 15, 1967, B 91,627
Int. Cl. C07c 127/00
U.S. Cl. 260—553 DA                 6 Claims

ABSTRACT OF THE DISCLOSURE

Novel sulfonyl ureas having the formula:

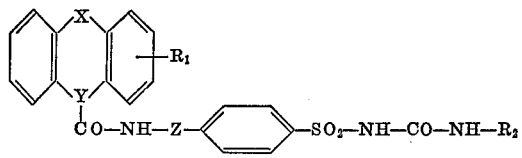

wherein X represents oxygen, sulfur, saturated, unsaturated, straight or branched chain alkylene containing up to 3 carbon atoms, oxymethylene, thiamethylene, thiaethylene, iminomethylene, alkylated iminomethylene, acylated iminomethylene, carboximido, alkylated carboximido, or a valency bond, $R_1$ is hydrogen, halogen, alkyl, alkoxy or trifluoromethyl, Y is saturated, unsaturated, straight or branched chain alkylene containing up to 6 carbon atoms or such alkylene group containing a nitrogen or oxygen atom, Z is straight or branched chain alkylene containing up to 4 carbon atoms and $R_2$ is straight or branched chain, saturated or unsaturated alkyl or cycloalkyl, and such groups interrupted by oxygen or sulfur atoms or containing an endo-alkylene group and substituted or unsubstituted aryl or aralkyl.

The aforesaid sulfonyl ureas constitute extremely effective anti-diabetic agents.

---

This application is a divisional of Ser. No. 711,840 filed Mar. 11. 1968, now Pat. No. 3,646,009.

This invention relates to sulfonyl ureas and sulfonyl semicarbazides and to processes for making and using the same.

The new and valuable sulfonyl-ureas and sulfonyl-semicarbazides, as they are produced according to the present invention, correspond to the following formula:

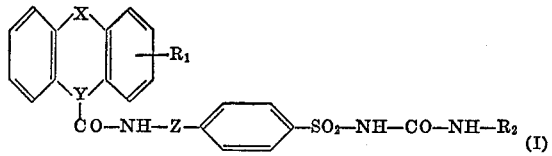

(I)

wherein X is oxygen, sulfur, saturated or unsaturated, straight or branched-chain alkylene containing up to 3 carbon atoms, oxymethylene, thiamethylene, thiaethylene, iminomethylene, alkylated iminomethylene, acylated iminomethylene, carboximido, alkylated carboximido, or a valency bond; $R_1$ is hydrogen, halogen, alkyl, alkoxy or trifluoromethyl; Y is saturated or unsaturated, straight or branched-chain alkylene containing up to 6 carbon atoms; which can also contain a nitrogen or oxygen atom; Z is straight or branched-chain alkylene containing up to 4 carbon atoms; and $R_2$ is straight or branched chain, saturated or unsaturated alkyl or cycloalkyl, which can also be interrupted by oxygen or sulfur atoms or can contain an endo-alkylene group, unsubstituted or substituted aryl or aralkyl or unsubstituted or substituted, saturated or unsaturated alkylene-imino containing 3–7 carbon atoms, which can also contain an endo-alkylene group.

A preferred group of substances within the scope of the invention are the following:

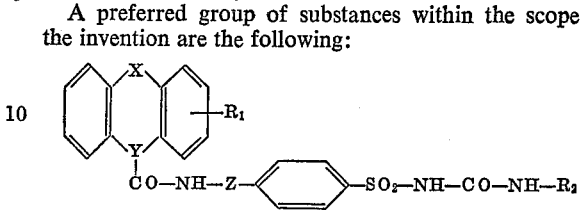

wherein $R_1$ indicates hydrogen, lower alkyl or alkoxy, halogen, Z is ethylene, X indicates a valency bond, an oxygen or sulfur atom, oxymethylene, thiamethylene, thiaethylene, ethylene or vinylene, Y indicates saturated or unsaturated, straight or branched chain alkylene containing 1 to 3 carbon atoms or iminomethylene, and $R_2$ indicates cycloalkyl containing 6 to 8 carbon atoms which can be substituted by 1 to 2 methyl or methoxy groups or which contain an endoalkylene group having 1 to 4 carbon atoms, alkyleneimino containing 5 to 6 carbon atoms which can be substituted by 1 to 2 methyl groups, lower alkyl, aralkyl or thiapyranyl.

The aforesaid group of compounds constitute particularly effective anti-diabetic agents.

A still more preferred group of compounds characterized by their outstanding therapeutic activity, i.e., anti-diabetic effect and absence of toxicity have the Formula I as above set out, in which Formula $R_1$ indicates hydrogen, lower alkyl or alkoxy, Z is ethylene, X indicates a valency bond, oxygen or sulfur atom, oxymethylene, thiamethylene or vinylene, Y indicates saturated or unsaturated alkylene containing 1 to 2 carbon atoms or iminomethylene, and $R_2$ indicates cycloalkyl containing 6 to 8 carbon atoms which can be substituted by 1 to 2 methyl or methoxy groups or which can contain an endo-alkylene group having 1 to 4 carbon atoms, alkyleneimino containing 5 to 6 carbon atoms or such alkyleneimino substituted with 1 to 2 methyl groups.

The most preferred group of compounds constituting the most therapeutically effective anti-diabetic agents have the Formula I above, wherein X is a valency bond, Y is methylene or ethylene, Z is ethylene, $R_1$ is H, lower alkyl or alkoxy, and $R_2$ is cycloalkyl containing 6 to 8 carbon atoms which can be substituted by 1 to 2 methyl or methoxy groups or which can contain an endoalkylene group having 1 to 4 carbon atoms, alkyleneimino containing 5 to 6 carbon atoms or alkyleneimino substituted by 1 to 2 methyl groups.

Said new compounds are obtained according to the process of the present invention by the conventional methods. Thus, for example, the following representative methods can be used:

(a) Reaction of a benzene-sulfonyl compound of the formula:

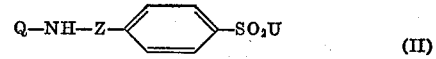

(II)

with a compound of the formula:

$$W-R_2 \quad (III)$$

wherein Q is a radical of the formula:

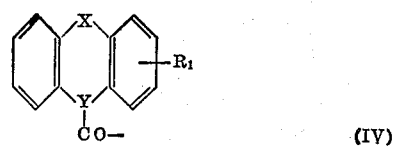

(IV)

and $R_1$, $R_2$, X, Y and Z indicate the same substituents as stated above and one of the substituents U and W represents amino, and the other represents an isocyanate group or a group which is converted into an isocyanate group under the reaction conditions.

Thus, for example, a sulfonamide, preferably in the form of its sodium or potassium salt, is reacted with an isocyanate having the formula $R_2 \cdot NCO$, wherein $R_2$ indicates the same substituents as stated above, or, alternatively a sulfonyl isocyanate is condensed with an appropriate amine having the formula $R_2 \cdot NH_2$, in which $R_2$ is as above defined, or with an acyl derivative thereof. In place of the isocyanates, there can also be used compounds which, under the reaction conditions, are able to undergo conversion into isocyanic acid esters. Illustrative of the "isocyanate formers" of this type, which can be used within the scope of the invention, are, for example, appropriate carbamic acid halides, urethanes, thiourethanes, ureas, as well as their acyl derivatives, disulfonyl-ureas and the corresponding hydrazine derivatives.

(b) Hydrolysis of a benzene-sulfonyl-thiourea and -thiosemicarbazide of the formula:

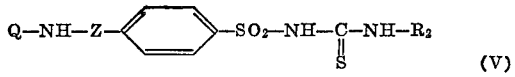
(V)

wherein Q, $R_2$ and Z indicate the same substituents as stated above, or of a benzene-sulfonyl-guanidine or amino-guanidine of the formula:

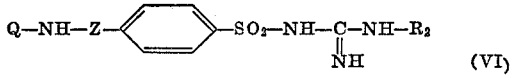
(VI)

wherein Q, $R_2$ and Z indicate the same substituents as stated above; or of a benzene-sulfonyl-isourea ether or -isosemicarbazide ether of the formula:

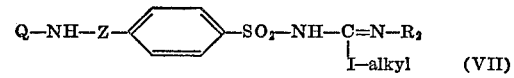
(VII)

wherein Q, $R_2$ and Z indicate the same substituents as stated above and I indicates an oxygen or sulfur atom.

The conversion of the sulfonyl-guanidine and -aminoguanidine is preferably brought about by alkaline hydrolysis, for example, by means of an alkali metal hydroxide, that of the isourea ether and isosemicarbazide ether by acidic hydrolysis, as for example, by means of a hydrohalic acid, and that of the thiourea and thio-semicarbazide by oxidative hydrolysis, as for example, by means of nitrous acid or heavy metal oxides, such as mercury oxide.

(c) Reaction of a benzene-sulfonyl halide of the formula:

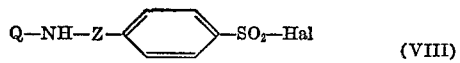
(VIII)

wherein Q and Z are as defined above and Hal is halogen, with a urea or semicarbazide of the formula:

$$H_2N-CO-NH-R_2 \quad (IX)$$

wherein $R_2$ has the above indicated meaning.

In the case of this latter method, in place of the urea or semicarbazide, it is more advantageous to use the corresponding parabanic acid derivative having the formula:

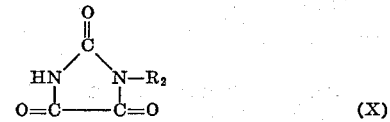
(X)

wherein $R_2$ is as above defined, followed by hydrolysis of the intermediate thereby obtained.

(d) Acylation of a benzene-sulfonyl derivative having the formula:

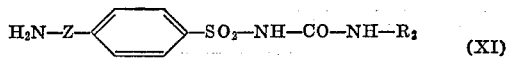
(XI)

wherein $R_2$ and Z indicate the same substituents as stated above, with a reactive derivative of an acid of the formula $Q \cdot OH$, in which Q has the same meaning as set out above.

This acylation is carried out in the conventional manner, as for example, by reaction with the appropriate acid halide, preferably in the presence of an acid acceptor, or with a reactive derivative thereof.

The following examples serve to illustrate the present invention without, however, limiting the same thereof.

EXAMPLE 1

3-[4-(β-fluorene-9-yl-acetylaminoethyl)-benzene-sulfonyl]-1-(4-methyl-cyclohexyl)-urea 4.5 g. 4-(β - fluorene - 9 - yl-acetylaminoethyl)-benzene-sulfonyl-carbamic acid ethyl ester in 100 ml. anhydrous toluene and 10 ml. dimethyl formamide were mixed, at a temperature of about 80° C. with 1.3 g. 4-methyl-cyclohexylamine and the resultant mixture boiled for 15 minutes. Thereafter, the reaction mixture was cooled and the solution extracted with 300 ml. 0.2 N sodium hydroxide solution. The sodium salt of the desired sulfonyl-urea was thereby precipitated out. The salt was then filtered off with suction, washed with ether and the compound dissolved, with gentle warming, in a mixture of 1 part of water and 1 part of acetone. Thereafter the solution was diluted with a further part of water. The thereby obtained solution, which was weakly alkaline, was acidified to a pH of 5.5 by the addition thereto of dilute hydrochloric acid. The acidification resulted in that the sulfonyl-urea was separated out in crystalline form. Following recrystallization from methanol, the compound had a melting point of 198–199° C. There were recovered 3.8 g. 3-[4-(β-fluorene - 9 - yl - acetylaminoethyl) - benzene-sulfonyl] - 1-(4-methyl-cyclohexyl)-urea (74% of theory).

The compounds set out in the following Table I were obtained in an analogous manner:

TABLE 1

| Compound | M.P. °C. | Yield, percent |
|---|---|---|
| 4-[4-(β-fluorene-9-yl-acetylaminoethyl)-benzene-sulfonyl]-1,1-(3,3-dimethyl-pentamethylene)-semicarbazide | 163–164 | 58 |
| 4-[4-(β-fluorene-9-yl-acetylaminoethyl)-benzene-sulfonyl]-1,1-(3-methyl-pentamethylene)-semicarbazide | 132–133 | 76 |
| 4-[4-(β-6,11-dihydro-dibenzo-[b,e]-oxepine-11-ylidene-acetylaminoethyl)-benzene-sulfonyl]-1,1-(3,3-dimethyl-pentamethylene)-semicarbazide | 183–184 | 53 |
| 3-[4-(β-6,11-dihydro-dibenzo-[b,e]-oxepine-11-ylidene-acetylaminoethyl)-benzene-sulfonyl]-1-(4-methyl-cyclohexyl)-urea | 216 217 | 65 |
| 3-[4-(β-6,11-dihydro-dibenzo-[b,e]-oxepine-11-yl-acetylaminoethyl)-benzene-sulfonyl]-1-(4-methyl-cyclohexyl)-urea | 186–187 | 51 |
| 4-[4-(β-6,11-dihydro-dibenzo-[b,e]-oxepine-11-yl-acetylaminoethyl)-benzene-sulfonyl]-1,1-(3,3-dimethyl-pentamethylene)-semicarbazide | 202–203 | 44 |
| 3-[4-(β-xanthene-9-yl-acetylaminoethyl)-benzene-sulfonyl]-1-(4-methyl-cyclohexyl)-urea | 208–210 | 48 |
| 4-[4-(β-xanthene-9-yl-acetylaminoethyl)-benzene-sulfonyl]-1,1-(3-methyl-pentamethylene)-semicarbazide | 128–130 | 45 |
| 3-[4-(β-6,11-dihydro-dibenzo-[b,e]-oxepine-11-ylidene-2-propionylaminoethyl)-benzene-sulfonyl]-1-(4-methyl-cyclohexyl)-urea | [1] 161–163 | 42 |
| 4-[4-(β-thiaxanthene-9-yl-acetylaminoethyl)-benzene-sulfonyl]-1,1-(3,3-dimethyl-pentamethylene)-semicarbazide | [2] 172–174 | 55 |
| 3-[4-(β-fluorene-9-yl-acetylaminoethyl)-benzene-sulfonyl]-1-(bicyclo-[2,2,1]-heptyl-2)-urea | 191–193 | 58 |
| 3-[4-(β-fluorene-9-yl-acetylaminoethyl)-benzene-sulfonyl]-1-cyclooctyl-urea | 192–193 | 52 |
| 3-[4-(β-fluorene-9-yl-acetylaminoethyl)-benzene-sulfonyl]-1-(adamantyl-1)-urea | 201–202 | 64 |
| 3-[4-(β-fluorene-9-yl-acetylaminoethyl)-benzene-sulfonyl]-1-cycloheptyl-urea | 178–180 | 49 |

[1] Potassium salt.
[2] Potassium salt (decomposition).

EXAMPLE 2

3-[4-(β-6,11-dihydro-dibenzo-[b,e]-oxepine-11-yl-acetylaminoethyl)-benzene-sulfonyl]-1-cyclohexyl-urea 4 g. 4-(β-6,11-dihydro-dibenzo-[b,e]-oxepine-11-yl-acetylaminoethyl)-benzene-sulfonamide, together with 2.5 g. ground potassium carbonate, in 100 ml. acetone were boiled for 30 minutes, while stirring. 1.5 g. cyclohexyl isocyanate were thereafter added in dropwise fashion and the resulting reaction mixture boiled under reflux for 2 hours, while stirring. The bulk of the solvent was then distilled off, the residue taken up in water, clarified with charcoal, filtered and the filtrate acidified with dilute hydrochloric acid. The sulfonyl-urea which thereby precipitated out was filtered off with suction, washed with water and recrystallized from alcohol. The sulfonyl urea had a melting point of 201–202° C. There were recovered 3.4 g. (66% of theory) 3-[4-(β-6,11-dihydro-dibenzo-[b,e] - oxepine - 11 - yl - acetylaminoethyl) - benzene-sulfonyl]-1-cyclohexyl-urea.

In an analogous manner, there was obtained 3-[4-(β-6,11 - dihydro - dibenzo - [b,e] - oxepine - 11 - yl - acetylaminoethyl)-benzene-sulfonyl]-1-n-butyl-urea, which had a melting point of 154–155° C., and from 4-(β-fluorene-9-ylidene-acetylaminoethyl)-benzene-sulfonamide (M.P. 215–216° C.), there was obtained 3-[4-(β-fluorene-9-ylidene - acetylaminoethyl) - benzene - sulfonyl] - 1 - cyclohexyl-urea, which had a melting point of 199–200° C.

EXAMPLE 3

3-[4-(β-xanthene-9-yl-carboxamido-ethyl)-benzene-sulfonyl]-1-cyclohexyl-urea 6.5 g. 3-[4-(β-aminoethyl)-benzene-sulfonyl]-1-cyclohexyl-urea (M.P. 211–212° C.) were suspended in 75 ml. pyridine, mixed with 5 g. xanthene-9-carboxylic acid chloride and allowed to stand at ambient temperature for 48 hours. The solvent was then distilled off in a vacuum, the residue digested with diluted hydrochloric acid, filtered off with suction and washed with water. The crude product thus obtained was purified by dissolving in 0.2 N sodium hydroxide solution and precipitated by the addition of dilute hydrochloric acid. There were recovered 8.6 g. (81% of theory) 3-[4-(β-xanthene-9-yl-carboxamido-ethyl)-benzene-sulfonyl]-1-cyclohexyl-urea which, following recrystallization from methanol, had a melting point of 218–220° C.

In an analogous manner there was obtained 3-[4-(β-10,11-dihydro - 5H - dibenzo-[a,d]-cycloheptene-5-yl-carboxamidoethyl - benzene - sulfonyl]-1-cyclohexyl - urea, which had a melting point of 202–203° C.

From 4-[4-(β-aminoethyl) - benzene - sulfonyl]-1,1-(3-methyl-pentamethylene)-semicarbazide (M.P. 210–212° C.) and 6,11-dihydro dibenzo-[b,e]-thiepine-11-yl-acetyl chloride, there was obtained, in an analogous manner, 4-[4-(β-6,11-dihydro - dibenzo-[b,e]-thiepine-11-yl-acetylaminoethyl) - benzene - sulfonyl]-1,1-(3-methyl - pentamethylene)-semicarbazide, which had a melting point of 222°–223° C.

EXAMPLE 4

3-[4-(β-thiaxanthene-9-yl-acetylaminoethyl)-benzene-sulfonyl]-1-(4-methyl-cyclohexyl)-urea 4.5 g. 4-(β-thiaxanthene - 9 - yl-acetylaminoethyl)-benzene-sulfonamide were dissolved in 20 ml. dimethyl formamide, admixed with an equimolar amount of sodium hydride and the mixture stirred for 10 minutes at ambient temperature. Thereafter, 2.0 g. pyrocarbonic acid diethyl ester were added, and then 10–15 minutes later 0.36 g. hydrogen chloride, dissolved in a little absolute ethanol was added to the resultant solution. The solution thus obtained of 4-(β-thiaxanthene-9-yl-acetylaminoethyl)-benzene-sulfonyl-carbamic acid ethyl ester was mixed with 1.4 g. 4-methyl-cyclohexylamine in 100 ml. toluene and this reaction mixture then boiled for 25 minutes. After cooling, the reaction mixture was extracted with 0.2 N sodium hydroxide solution and the desired sulfonyl-urea thereafter precipitated out by the addition of dilute hydrochloric acid. There were recovered 3.2 g. (55% of theory) 3-[4-(β-thiaxanthene-9-yl-acetylaminoethyl)-benzene-sulfonyl]-1-(4-methyl - cyclohexyl)-urea which, following recrystallization from methanol, had a melting point of 198–199° C.

EXAMPLE 5

3-[4-(β-fluorene-9-yl-acetylaminoethyl)benzene-sulfonyl]-1-(4-methoxy-cyclohexyl)-urea 8.6 g. of the sodium salt of 4-(β-fluorene-9-yl-acetylaminoethyl)-benzene-sulfonamide were suspended in 20 ml. dimethyl formamide, 4.0 g. pyrocarbonic acid diethyl ester were added thereto and, following completion of the reaction which then took place, the reaction mixture was mixed with 0.73 g. hydrogen chloride in a little absolute ethanol. Thereafter, 3.3 g. 4-methoxy-cyclohexylamine in 150 ml. toluene were added and the resultant reaction mixture boiled for 15–20 minutes. The further working up of the reaction mixture was carried out as described in Example 4. After recrystallization of the crude product from methanol/dimethyl formamide/water (2:1:2.5), there were obtained 6.8 g. (61% of theory) 3-[4-(β-fluorene-9 - yl - acetylaminoethyl)-benzene-sulfonyl]-1-(4-methoxy-cyclohexyl)-urea, which had a melting point of 196–197° C.

The compounds set out in Table II, which follows, were prepared in an analogous manner to that described in Examples 4 and 5:

TABLE II

| Compound | Prepared according to example— | M.P. in ° C. | Yield, percent |
| --- | --- | --- | --- |
| 4-[4-(β-thiaxanthene-9-yl-acetylaminoethyl)-benzene-sulfonyl]-1,1-(3-methylpentamethylene)-semicarbazide | 4 | 175–176 | 48 |
| 3-[4-(β-fluorene-9-yl-acetylaminoethyl)-benzene-sulfonyl]-1-(tetrahydro-thiapyranyl-4)-urea | 5 | 221–222 | 53 |
| 3-[4-(β-fluorene-9-yl-acetylaminoethyl)-benzene-sulfonyl]-1-(4,4-dimethyl-cyclohexyl)-urea | 5 | 197–198 | 67 |
| 3-[4-(β-fluorene-9-yl-acetylaminoethyl)-benzene-sulfonyl]-1-(β-phenyl-ethyl)-urea | 5 | 186–187 | 55 |
| 4-[4-(β-fluorene-9-yl-acetylaminoethyl)-benzene-sulfonyl]-1,1-hexamethylene-semicarbazide | 5 | 110–112 | 72 |
| 4-[4-(β-fluorene-9-ylideneacetylaminoethyl)-benzene-sulfonyl]-1,1-(3-methyl-pentamethylene)-semicarbazide | 4 | 155–156 | 63 |
| 3-[4-(β-6,11-dihydro-dibenzo-[b,c]-thiepine-11-ylideneacetylaminoethyl)-benzene-sulfonyl]-1-(4-methyl-cyclohexyl)-urea | 4 | 189–190 | 70 |
| 4-[4-(β-6,11-dihydro-dibenzo-[b,e]-thiepine-11-ylideneacetylaminoethyl)-benzene-sulfonyl]-1,1-(3-methyl-pentamethylene)-semicarbazide | 4 | 210–211 | 74 |
| 3-[4-(β-fluorene-9-ylidene-acetylaminoehtyl)-benzene-sulfonyl]-1-(4-methyl-cyclohexyl)-urea | 4 | 210–212 | 72 |
| 3-[4-(β-fluorene-9-acetylaminoethyl)-benzene-sulfonyl]-1-cyclohexyl-urea | 5 | 204–205 | 54 |
| 3-[4-(β-5H-dibenzo-[a,d]-cycloheptene-5-yl-acetylaminoethyl)-benzene-sulfonyl]-1-(4-methylcyclohexyl)-urea | 4 | 174–175 | 67 |
| 3-[4-(β-12H-6,7-dihydrodibenzo-[b,e]-thiocine-12-yl-acetylaminoethyl)-benzene-sulfonyl]-1-(4-methyl-cyclohexyl)-urea | 4 | 184–186 | 71 |
| 3-[4-(β-carbazol-9-yl-acetylaminoethyl)-benzene-sulfonyl]-1-cyclohexyl-urea | 4 | 196–198 | 64 |
| 3-[4-(β-carbazol-9-yl-acetylaminoethyl)-benzene-sulfonyl]-1-(4-methyl-cyclohexyl)-urea | 4 | 198–200 | 73 |
| 4-[4-(β-carbazol-9-yl-acetylaminoethyl)-benzene-sulfonyl]-1,1-(3-methyl-pentamethylene)-semicarbazide | 4 | 154–156 | 58 |
| 3-{4-[β-(β-carbazol-9-yl-propionylamino)-ethyl]-benzene-sulfonyl}-1-(4-methyl-cyclohexyl)-urea | 4 | 206–208 | 63 |
| 3-[4-(β-5H,10,11-dihydro-dibenzo-[a,d]-cycloheptene-5-ylidene-acetylaminoethyl)-benzene-sulfonyl]-1-(4-methyl-cyclohexyl)-urea | 4 | 194–195 | 51 |
| 3-[4-(β-5H,10,11-dihydro-dibenzo-[a,d]-cycloheptene-5-yl-acetylaminoethyl)-benzene-sulfonyl]-1-(4-methyl-cyclohexyl)-urea | 4 | 204–206 | 63 |
| 4-[4-(β-6,11-dihydro-dibenzo-[b,e]-thiepine-11-yl-acetylaminoethyl)-benzene-sulfonyl]-1-(4-methyl-cyclohexyl)-urea | 4 | 153–155 | 51 |
| 4-[4-(β-6,11-dihydro-dibenzo-[b,e]-thiepine-11-yl-acetylaminoethyl)-benzene-sulfonyl]-1,1-(3,3-dimethyl-pentamethylene)-semicarbazide | 4 | 226–228 | 50 |
| 4-[4-(β-6,11-dihydro-dibenzo-[b,e]-oxepine-11-yl-acetylaminoethyl)-benzene-sulfonyl]-1,1-(3-methyl-pentamethylene)-semicarbazide | 4 | 198–200 | 48 |

TABLE II—Continued

| Compound | Prepared according to example— | M.P. in °C. | Yield, percent |
|---|---|---|---|
| 3-[4-(β-fluorene-9-yl-carboxamido-ethyl)-benzene-sulfonyl]-1-cyclohexyl-urea | 4 | 207–208 | 55 |
| 3-[4-(β-fluorene-9-yl-carboxamidoethyl)-benzene-sulfonyl]-1-(4-methyl-cyclohexyl)-urea | 4 | 224–226 | 75 |
| 4-[4-(β-fluorene-9-yl-carboxamido-ethyl)-benzene-sulfonyl]-1,1-(3-methyl-pentamethylene)-semicarbazide | 4 | 172–173 | 62 |
| 3-[4-(β-fluorene-9-yl-propionylaminoethyl)-benzene-sulfonyl]-1-cyclohexyl-urea | 4 | 207–208 | 60 |
| 3-[4-(β-fluorene-9-yl-propionylaminoethyl)-benzene-sulfonyl]-1-(4-methyl-cyclohexyl)-urea | 4 | 210–212 | 59 |
| 4-[4-(β-fluorene-9-yl-propionylaminoethyl)-benzene-sulfonyl]-1,1-(3,3-dimethyl-pentamethylene)-semicarbazide | 4 | 156–158 | 52 |
| 3-[4-(β-2-methoxy-6,11-dihydrodibenzo-[b,e]-oxepine-11-yl-acetylaminoethyl)-benzene-sulfonyl]-1-(4-methyl-cyclohexyl)-urea | 4 | 172–174 | 67 |
| 3-[4-(β-2-methyl-6,11-dihydrodibenzo-[b,e]-oxepine-11-yl-acetylaminoethyl)-benzene-sulfonyl]-1-(4-methyl-cyclohexyl)-urea | 4 | 179–180 | 56 |
| 3-[4-(β-2-chloro-6,11-dihydrodibenzo-[b,e]-oxepine-11-yl-acetylaminoethyl)-benzene-sulfonyl]-1-(4-methyl-cyclohexyl)-urea | 4 | 210–212 | 72 |
| 3-[4-(β-3-methyl-fluorene-9-yl-acetylaminoethyl)-benzene-sulfonyl]-1-(4-methyl-cyclohexyl)-urea | 4 | 202–203 | 75 |
| 3-[4-(β-3-methoxy-fluorene-9-yl-acetylaminoethyl)-benzene-sulfonyl]-1-(4-methyl-cyclohexyl)-urea | 4 | 168–169 | 58 |
| 3-[4-(β-2-chloro-fluorene-9-yl-acetylaminoethyl)-benzene-sulfonyl]-1-(4-methyl-cyclohexyl)-urea | 6 | 218–220 | 6 |

The compounds required for use as starting materials can be prepared according to the following methods:

(a) Acylaminoethyl-benzene-sulfonamides 1 mol of the corresponding carboxylic acid chloride dissolved in methylene chloride, was added dropwise at ambient temperature and with intensive stirring to a solution of 1 mol 4-(β-aminoethyl)-benzene-sulfonamide [M.P. 145–147° C.; prepared by the chlorosulfonation of N-acetyl-β-phenyl-ethylamine. The crude sulfochloride thereby obtained was then aminated to give 4-(β-N-acetylaminoethyl) - benzene - sulfonamide (M.P. 164–166° C.) followed by deacetylation via alkaline hydrolysis] and 2 mol sodium carbonate in water and the reaction mixture thereafter stirred for 1–2 hours. The desired compound precipitated out in the form of its sodium salt. This salt was brought to solution by the addition of a dilute solution of sodium hydroxide and dilution with water (pH of about 10–11), the methylene chloride separated off and the 4-(β-acylaminoethyl)-benzenesulfonamide precipitated out by the addition to dilute hydrochloric acid to a pH of about 8.8. If desired, the product could be recrystallized from dilute alcohol or from alcohol/dimethyl formamide/water (about 10:1:6).

(b) Acylaminoethyl-benzene-sulfonyl-carbamic acid esters 1 mol of the acylaminoethyl-benzene-sulfonamide obtained according to (a) above was dissolved in dimethyl formamide, mixed with 1 mol sodium hydride, while cooling, and then stirred for 20 minutes at ambient temperature. The resultant reaction mixture was then mixed with 1.2 mol pyrocarbonic acid diethyl ester and heated, while stirring, to 60° C. After subsidence of the evolution of carbon dioxide, the solvent was distilled off in a vacuum, the residue dissolved in a large quantity of water and the carbamic acid ester thus obtained precipitated out by acidifying, while stirring, with dilute hydrochloric acid to a pH of about 3–4. If desired, the product obtained could be recrystallized from alcohol.

In the following Table III, there are set out a number of benzene-sulfonamides and benzene-sulfonyl-carbamic acid esters prepared in the above-described manner. The melting points of the initial tricyclic carboxylic acids (Q.OH) are given in the first column of this table.

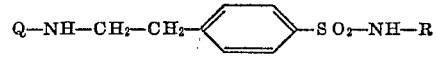

TABLE III

| M.P. of Q·OH in °C. | Q | R | M.P. in °C. |
|---|---|---|---|
| 229–231 | Fluorene-9-ylidene-acetyl | H | 215–216 |
| 139–141 | Fluorene-9-yl-acetyl | H / —COOC$_2$H$_5$ | 207–209 / 135–136 |
| 158–159 | Xanthene-9-yl-acetyl | H / —COOC$_2$H$_5$ | 236–238 / 162–164 |
| 170–171 | Thiaxanthene-9-yl-acetyl | H / —COOC$_2$H$_5$ | 208–209 / 137–139 |
| 185–186 | 6,11-dihydro-dibenzo-[b,e]-oxepine-11-ylidene-acetyl | H / —COOC$_2$H$_5$ | 238–239 / 196–197 |
| 117–119 | 6,11-dihydro-dibenzo-[b,e]-oxepine-11-yl-acetyl | H | 178–179 |
| 178 | 6,11-dihydro-dibenzo-[b,e]-oxepine-11-ylidene-2-propionyl | —COOC$_2$H$_5$ | 128–130 |
| 179–181 | 6,11-dihydro-dibenzo-[b,e]-thiepine-11-ylidene-acetyl | H | 210–212 |
| 208–209 | 6,11-dihydro-dibenzo-[b,e]-thiepine-11-yl-acetyl | H | 167–169 |
| 200–202 | 6,7-dihydro-12H-dibenzo-[b,e]-thiocine-12-ylidene-acetyl | | |
| 193 | 6,7-dihydro-12H-dibenzo-[b,e]-thiocine-12-yl-acetyl | H | 163–165 |
| 267–268 | 6-oxo-5,6-dihydro-11H-dibenzo-[b,e]-azepine-11-yl-acetyl | | |
| 167–168 | 5H-dibenzo-[a,d]-cycloheptene-5-yl-acetyl | H | 197–198 |
| 162–164 | 10,11-dihydro-5H-dibenzo-[a,d]-cycloheptene-5-yl-acetyl | H | 194–195 |
| 167–168 | 10,11-dihydro-5H-dibenzo-[a,d]-cycloheptene-5-ylidene-acetyl | H | 197–198 |
| 215 | Carbazol-9-yl-acetyl | H | 254–255 |
| 166–168 | β-(carbazol-9-yl)-propionyl | H | 173 |
| 218–220 | Fluorene-9-yl-carbonyl | H | 234–236 |
| 145–146 | β-(fluorene-9-yl)-propionyl | H | 186–188 |
| 126–127 | 3-methyl-fluorene-9-yl-acetyl | H | 210–211 |
| 170–171 | 3-methoxy-fluorene-9-yl-acetyl | H | 158–160 |
| | 2-chlorofluorene-9-yl-acetyl | H | 212–213 |
| 119–120 | 2-methoxy-6,11-dihydrodibenzo-[b,e]-oxepine-11-yl-acetyl | H | 138–140 |
| 110–111 | 2-methyl-6,11-dihydrodibenzo-[b,e]-oxepine-11-yl-acetyl | H | 169–170 |
| 211–212 | 2-chloro-6,11-dihydrodibenzo-[b,e]-oxepine-11-yl-acetyl | H | 190–192 |

The blood sugar reducing activities of some of the new sulfonyl ureas and sulfonyl semicarbazides were determined. The blood sugar reducing activity was measured in the rabbit following the i.v. administration of the test compounds, i.e., in each instance the so-called threshold dose was found and namely the smallest dose of compound producing a significant reduction in the blood sugar level. The values as reported in the table which follows are relative values based on $N_1$-(sulfanilyl)-$N_2$-(n-butyl)-urea equal to 1. The threshold dose of the $N_1$-(sulfanilyl)-$N_2$-(n-butyl)urea amounted in this series of tests to 200 mg./kg.

The results are set forth in the following table.

with a suitable pharmaceutical diluent is employed. One or two unit dosages are good from one to four times a day.

TABLE

| Compound | Relative blood sugar reducing activity (rabbit I.V.) |
|---|---|
| 3-[4-(β-fluorene-9-yl-acetyl-aminoethyl)-benzene-sulfonyl-1-(4-methyl-cyclohexyl)-urea | 8,000 |
| 4-[4-(β-fluorene-9-yl-acetyl-aminoethyl)-benzene-sulfonyl]-1,1-(3,3-dimethyl-pentamethylene)-semicarbazide | 16,000 |
| 4-[4-(β-fluorene-9-yl-acetyl-aminoethyl)-benzene-sulfonyl]-1,1-(3-methyl-pentamethylene)-semicarbazide | 16,000 |
| 4-[4-(β-6,11-dihydro-dibenzo-[b,e]-oxepine-11-ylidene-acetyl-aminoethyl)-benzene-sulfonyl]-1,1-(3,3-dimethyl-pentamethylene)-semicarbazide | 2,000 |
| 3-[4-(β-6,11-dihydro-dibenzo-[b,e]-oxepine-11-ylidene-acetyl-aminoethyl)-benzene-sulfonyl]-1-(4-methylcyclohexyl)-urea | 800 |
| 3-[4-(β-6,11-dihydro-dibenzo-[b,e]-oxepine-11-yl-acetyl-aminoethyl)-benzene-sulfonyl]-1-(4-methyl-cyclohexyl)-urea | 800 |
| 4-[4-(β-6,11-dihydro-dibenzo-[b,e]-oxepine-11-yl-acetyl-aminoethyl)-benzene-sulfonyl]-1,1-(3,3-dimethyl-pentamethylene)-semicarbazide | 2,000 |
| 3-[4-(β-xanthene-9-yl-acetyl-aminoethyl)-benzene-sulfonyl]-1-(4-methyl-cyclohexyl)-urea | 2,000 |
| 4-[4-(β-xanthene-9-yl-acetyl-aminoethyl)-benzene-sulfonyl]-1,1-(3-methyl-pentamethylene)-semicarbazide | 400 |
| 4-[4-(β-thiaxanthene-9-yl-acetyl-aminoethyl)-benzene-sulfonyl]-1,1-(3,3-dimethyl-pentamethylene)-semicarbazide | 2,000 |
| 3-[4-(β-fluorene-9-yl-acetyl-aminoethyl)-benzene-sulfonyl]-1-(bicyclo[2,2,1]-heptyl-2)-urea | 4,000 |
| 3-[4-(β-fluorene-9-yl-acetyl-aminoethyl)-benzene-sulfonyl]-1-cyclooctyl-urea | 4,000 |
| 3-[4-(β-fluorene-9-yl-acetyl-aminoethyl)-benzene-sulfonyl]-1-(adamantyl-1)-urea | 4,000 |
| 3-[4-(β-fluorene-9-yl-acetyl-aminoethyl)-benzene-sulfonyl]-1-cycloheptyl-urea | 4,000 |
| 3-[4-(β-6,11-dihydro-dibenzo-[b,e]-oxepine-11-yl-acetyl-aminoethyl)-benzene-sulfonyl]-1-cyclohexyl-urea | 2,000 |
| 3-[4-(β-6,11-dihydro-dibenzo-[b,e]-oxepine-11-yl-acetyl-aminoethyl)-benzene-sulfonyl]-1-n-butyl-urea | 200 |
| 4-[4-(β-6,11-dihydro-dibenzo-[b,e]-thiepine-11-yl-acetyl-aminoethyl)-benzene-sulfonyl]-1,1-(3-methyl-pentamethylene)-semicarbazide | 800 |
| 3-[4-(β-thiaxanthene-9-yl-acetyl-aminoethyl)-benzene-sulfonyl]-1-(4-methylcyclohexyl)-urea | 2,000 |
| 3-[4-(β-fluorene-9-yl-acetyl-aminoethyl)-benzene-sulfonyl]-1-(4-methoxy-cyclohexyl)-urea | 4,000 |
| 4-[4-(β-thiaxanthene-9-yl-acetyl-aminoethyl)-benzene-sulfonyl]-1,1-(3-methyl-pentamethylene)-semicarbazide | 400 |
| 3-[4-(β-fluorene-9-yl-acetyl-aminoethyl)-benzene-sulfonyl]-1-(tetrahydro-thiapyranyl-4)-urea | 800 |
| 3-[4-(β-fluorene-9-yl-acetyl-aminoethyl)benzene-sulfonyl]-1-(4,4-dimethyl-cyclohexyl)-urea | 4,000 |
| 3-[4-(β-fluorene-9-yl-acetyl-aminoethyl)-benzene-sulfonyl]-1-(β-phenyl-ethyl)-urea | 400 |
| 4-[4-(β-fluorene-9-yl-acetyl-aminoethyl)-benzene-sulfonyl]-1,1-hexamethylene-semicarbazide | 16,000 |
| 3-[4-(β-6,11-dihydro-dibenzo-[b,e]-thiepine-11-yl-acetyl-aminoethyl)-benzene-sulfonyl]-1-(4-methyl-cyclohexyl)-urea | 800 |
| 4-[4-(β-6,11-dihydro-dibenzo-[b,e]-thiepine-11-ylidene-acetyl-aminoethyl)-benzene-sulfonyl]-1,1-(3-methyl-pentamethylene)-semicarbazide | 2,000 |
| 3-[4-(β-fluorene-9-yl-acetyl-aminoethyl)-benzene-sulfonyl]-1-cyclohexylurea | 8,000 |
| 3-[4-(β-5H-dibenz-[a,d]-cycloheptene-5-yl-acetyl-aminoethyl)-benzene-sulfonyl]-1-(4-methyl-cyclohexyl)-urea | 2,000 |
| 3-[4-(β-12H-6,7-dihydro-dibenzo-[b,e]-thiocine-12-yl-acetyl-aminoethyl)-benzene-sulfonyl]-1-(4-methyl-cyclohexyl)-urea | 400 |
| 3-[4-(β-carbazol-9-yl-acetyl-aminoethyl)-benzene-sulfonyl]-1-cyclohexyl-urea | 2,000 |
| 3-[4-(β-carbazol-9-yl-acetyl-aminoethyl)-benzene-sulfonyl]-1-(4-methyl-cyclohexyl)-urea | 800 |
| 4-[4-(β-carbazol-9-yl-acetyl-aminoethyl)-benzene-sulfonyl]-1,1-(3-methyl-pentamethylene)-semicarbazide | 2,000 |
| 3-[4-(β-5H-10,11-dihydro-dibenzo-[a,d]-cycloheptene-5-ylidene-acetyl-aminoethyl)-benzene-sulfonyl]-1-(4-methyl-cyclohexyl)-urea | 800 |
| 3-[4-(β-5H-10,11-dihydro-dibenzo-[a,d]-cycloheptene-5-yl-acetyl-aminoethyl)-benzene-sulfonyl]-1-(4-methyl-cyclohexyl)-urea | 800 |
| 4-[4-(β-6,11-dihydro-dibenzo-[b,e]-thiepine-11-yl-acetyl-aminoethyl)-benzene-sulfonyl]-1-(4-methyl-cyclohexyl)-urea | 400 |
| 4-[4-(β-6,11-dihydro-dibenzo-[b,e]-thiepine-11-yl-acetyl-aminoethyl)-benzene-sulfonyl]-1,1-(3,3-dimethyl-pentamethylene)-semicarbazide | 800 |
| 4-[4-(β-6,11-dihydro-dibenzo-[b,e]-oxepine-11-yl-acetyl-aminoethyl)-benzene-sulfonyl]-1,1-(3-methyl-pentamethylene)-semicarbazide | 2,000 |
| 3-[4-(β-fluorene-9-yl-carboxamido-ethyl)-benzene-sulfonyl]-1-cyclohexyl-urea | 4,000 |
| 3-[4-(β-fluorene-9-yl-carboxamido-ethyl)-benzene-sulfonyl]-1-(4-methyl-cyclohexyl)-urea | 8,000 |
| 3-[4-(β-3-methyl-fluorene-9-yl-acetyl-aminoethyl)-benzene-sulfonyl]-1-(4-methyl-cyclohexyl)-urea | 4,000 |
| 3-[4-(β-3-methoxy-fluorene-9-yl-acetyl-aminoethyl)-benzene-sulfonyl]-1-(4-methyl-cyclohexyl)-urea | 4,000 |
| 3-[4-(β-2-chlor-fluorene-9-yl-acetyl-aminoethyl)-benzene-sulfonyl]-1-(4-methyl-cyclohexyl)-urea | 800 |

In normal clinical use, the compounds can be employed in both the free and the salt form. The activity of the compounds is independent of whether they are in salt form or otherwise. Salts may be prepared by any of the well-known standard methods. While the salt normally employed is the alkali salt and preferably the sodium salt, the compounds have been prepared in the form of other salts, such as potassium, ammonium, etc.

The products of this process may be combined with a pharmaceutical carrier for administration to humans in an amount to attain the desired blood sugar reducing effect. Such carriers are either solid or liquid. Exemplary of solid pharmaceutical carriers are lactose, cornstarch, mannitol, talc, etc. The compounds of this invention are mixed with a carrier and filled into hard gelatin capsules or tabletted with suitable tabletting aids, such as magnesium stearate, starch, or other lubricants, disintegrants or coloring agents. If combination with a liquid carrier is desirable, a soft gelatin capsule is filled with a slurry or other dispersion of the novel compounds in soya-bean, corn or peanut oil. Aqueous suspensions or solutions are prepared for alternate, oral or parenteral administration.

The dosage of the novel compounds of the present invention for the treatment of diabetes depends in the main on the age, weight, and condition of the patient being treated. The preferable form of administration is via the oral route in connection with which dosage units containing 5–500 mg. of active compound in combination

What is claimed is:

1. A compound having the formula:

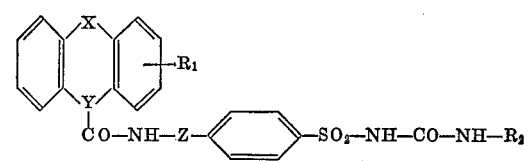

wherein X is selected from the group consisting of oxygen, sulfur, ethylene, vinylene, oxymethylene, thiamethylene, thiaethylene, and a valency bond; $R_1$ is selected from the group consisting of hydrogen, chloro, methyl and methoxy; Y is selected from the group consisting >CH—, >CH—CH$_2$—, >CH—CH$_2$—CH$_2$—, >C=CH—, and >N—CH$_2$—, with the proviso that X and Y cannot both contain a hetero atom and the further proviso that the ring containing X and Y contain no more than 8 ring atoms; Z is selected from the group consisting of straight and branched chain alkylene containing up to 4 carbon atoms; and $R_2$ is selected from the group consisting of cycloalkyl containing 6 to 8 ring carbon atoms which may be substituted by 1 to 2 methyl or methoxy groups, bicyclo[2,2,1]-heptyl-2, adamantyl, lower alkyl, phenyl loweralkyl wherein the alkyl group contains up to 2 carbon atoms and tetrahydrothiapyranyl.

2. A compound according to claim 1 wherein Z is ethylene.

3. A compound according to claim 1 designated 3-[4-($\beta$ - fluorene - 9 - yl-acetyl-aminoethyl)-benzenesulfonyl]-1-(4-methyl-cyclohexyl)-urea.

4. A compound according to claim 1 designated 3-[4-($\beta$ - fluorene - 9-yl-carboxamido-ethyl)-benzenesulfonyl]-1-(4-methyl-cyclohexyl)-urea.

5. A compound according to claim 1 designated 3-[4-($\beta$ - fluorene - 9 - yl-acetylaminoethyl)-benzenesulfonyl]-1-cycloheptylurea.

6. A compound according to claim 1 designated 3-[4-($\beta$ - fluorene - 9 - yl-acetylaminoethyl)-benzenesulfonyl]-1-cyclohexylurea.

References Cited

UNITED STATES PATENTS 3,449,346   6/1969   Aumüller et al. _ 260—566 DA X

BERNARD HELFIN, Primary Examiner

G. A. SCHWARTZ, Assistant Examiner

U.S. Cl. X.R.

260—345.3, 329.3 327 B, 333, 327 B, 293.54, 239 D, 293.57, 293.58, 293.59, 326.81, 326.82